United States Patent [19]

Uyeda et al.

[11] Patent Number: 4,479,693

[45] Date of Patent: Oct. 30, 1984

[54] DEVICE FOR DETACHABLY ATTACHING ELECTRIC APPLIANCES

[75] Inventors: Takashi Uyeda; Masaaki Matsumoto, both of Sakai, Japan

[73] Assignee: Tsuyama Mfg. Co., Ltd., Japan

[21] Appl. No.: 404,313

[22] Filed: Aug. 2, 1982

[30] Foreign Application Priority Data

Aug. 7, 1981 [JP] Japan .............................. 56-117915

[51] Int. Cl.$^3$ ......................................... H01R 13/627
[52] U.S. Cl. ................................................. 339/119 R
[58] Field of Search .................. 70/58; 224/31 A, 41; 339/75 M, 91 A, 119

[56] References Cited

U.S. PATENT DOCUMENTS

| | | | |
|---|---|---|---|
| 2,588,671 | 3/1952 | Tringau ............................. | 224/41 X |
| 3,723,947 | 3/1973 | Wzeau ............................... | 339/91 R |
| 4,050,767 | 9/1977 | Berning .......................... | 339/91 R X |
| 4,083,620 | 4/1978 | Burgin ................................. | 70/58 X |

Primary Examiner—Eugene F. Desmond

Attorney, Agent, or Firm—Allegretti, Newitt, Witcoff & McAndrews, Ltd.

[57] ABSTRACT

A multi-purpose, particularly antitheft-purpose, device for attachment and detachment of electric appliances to a bicycle, etc. is comprised of a casing and a bracket. The casing is designed to have therein one or more electric appliances, for example, a clock, or an electronic meter for determining a variety of functions including speed and distances. The casing is provided in appropriate portions with a pair of opposed grooves in which a pair of resilient contacts are slidingly inserted. The casing is also formed with a locking plate having therein an locking opening. The bracket, which is designed to be clamped onto the handle bar pipe, is composed of a main part and a subpart which are pivotally secured at one end to each other. The bracket has a pair of inserts to be slidingly inserted into the said grooves in the casing. The inserts each have on the sliding side a pair of contacts to be connected with wiring and engaged with the first mentioned contacts.

2 Claims, 5 Drawing Figures

DEVICE FOR DETACHABLY ATTACHING ELECTRIC APPLIANCES

BACKGROUND OF THE INVENTION

Relatively expensive electric appliances such as tachometers, radio sets, electric clocks, etc. have been attached to bicycles, powered bicycles or autocycles as by screws. Since they have been easily removable as by drivers, however, they have often been robbed while being left in a given parking area.

SUMMARY OF THE INVENTION

The present invention relates to a so-called antitheft, device for detachably attaching electric appliances to (powered) bicycles, autocycles etc.

A main object of the present invention is to provide a multi-purpose, particularly antitheft-purpose, device for detachably attaching expensive electric appliances such as tachometers, radio sets and electric clocks to bicycles etc. in a single operation with no risk of misalignment, short circuit and disconnection which may otherwise be caused by violent vibration.

With the inventive device it is possible to remove temporarily such expensive parts from a bicycle for carryingabout, conservation and replacement with other appliances.

BRIEF DESCRIPTION OF THE DRAWINGS

The above-mentioned and other features of the present invention will become apparent from a reading of the following detailed description of preferred embodiments with reference to the accompanying drawings, in which.

DETAILED EXPLANATION OF PREFERRED EMBODIMENTS

Figure 1:
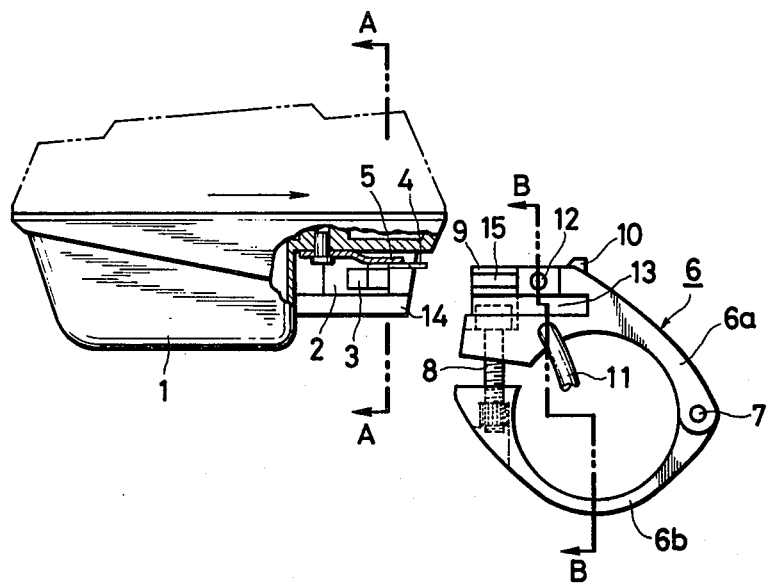
FIG. 1 is a partially cut away side view of the device according to the present invention, which is shown as being removed from, e.g., a bicycle.
Figure 2:
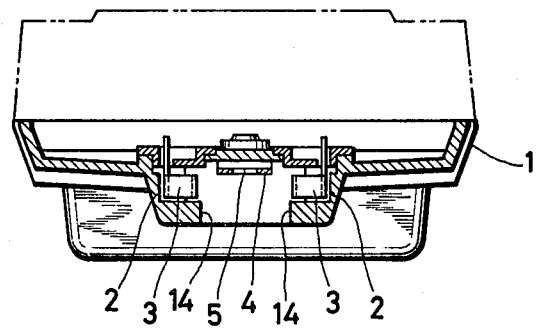
FIG. 2 is a sectional view taken along the line A—A of FIG. 1.
Figure 3:
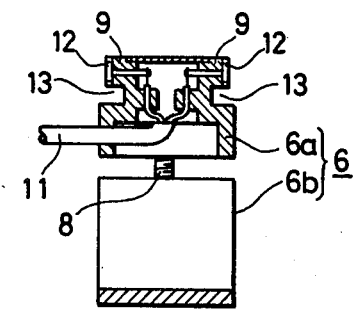
FIG. 3 is a sectional view taken along the line B—B of FIG. 1.
Figure 4:
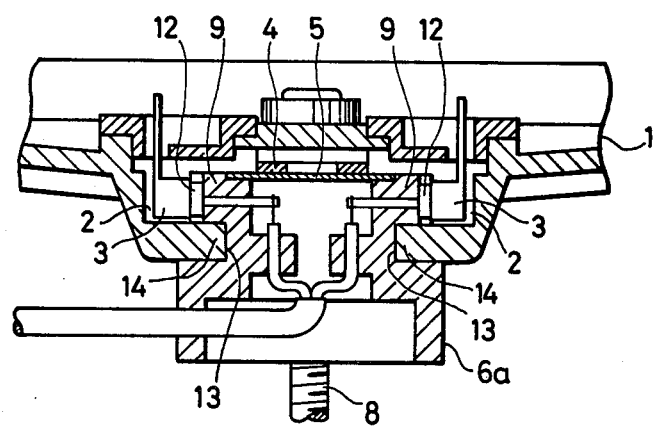
FIG. 4 is an enlarged sectional view of parts of the inventive device attached to the bicycle.
Figure 5:
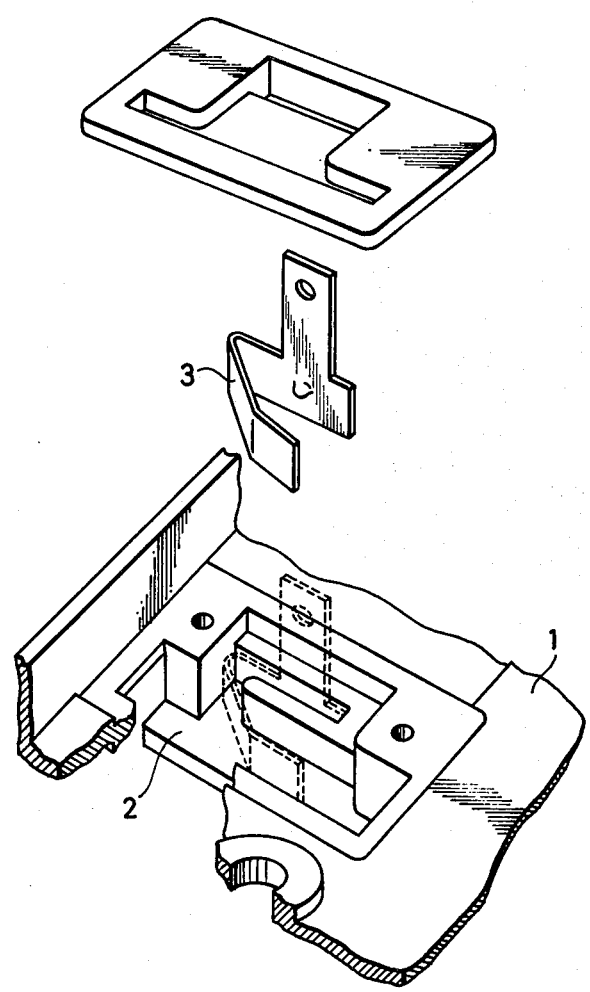
FIG. 5 is an exploded perspective view of parts of the causing on an enlarged scale.

Referring now to FIG. 1, a casing 1 is formed of a synthetic resin material or other material, and designed to have therein a tachometer, a radio set, an electirc clock, a lamp, an alarm, a battery and the like, either alone or in combination, although not illustrated. The casing 1 is provided at its lower side with a pair of opposite grooves 2, which receive resiliently a pair of resilient contacts 3 to be connected to the electric appliances. A locking resilient plate 4 having therein a locking opening 5 is fixed to an appropriate portion of the casing 1.

A bracket 6 is comprised of a main part 6a and a subpart 6b, both being preferably molded of a filled synthetic resin material, such as nylon, which excels in creep properties and dimensional stability. Both parts have one ends pivotally secured at 7 to each other and the other ends attached to the handle bar pipe, fork and/or frame pipe of, e.g., a bicycle.

The bracket 6 is provided on its main part 6a with a pair of inserts 9 to be slidingly, inserted into the said pair of grooves 2 in the casing 1, and with a projection 10 to be engageable within the locking opening 5 in the locking plate 4. A pair of rivetlike contacts 12 are mounted on appropriate portions of the said pair of inserts 9 in such a manner that they come resilient contact with the said resilient contacts 3, and fixed to the end of wiring 11 for the connection of a power source, a signal and the like to the electric appliances.

The main part 6a of the bracket 6 is also provided therein with a guide groove 13, into which a guide member 14 is inserted. Attachment of the Device is effected as follows:

The bracket 6 is first secured to the handle bar pipe of e.g., a bicycle by a screw 8. Then, the guide member 14 is placed in the guide groove 13 in the bracket 6 to permit sliding insertion of the grooves 2 of the casing 1 over the inserts 9 of the bracket 6. Finally, a push is given to the guide member 14 as shown by an arrow in FIG. 1, whereby the locking projection 10 of the bracket 6 is retained in the locking opening 6 in the locking plate 4, and the said pair of contacts 12 come in resilient contact with the said pair of resilient contact 3 so that the wiring circuit is closed. Thus the casing 1 is properly attached to the bracket 6.

As mentioned above, the attachment of the inventive device can rapidly be effected in a single operation without resorting to any tool or part. In addition, the inventive device can be used with no fear of misalignment, short circuit, disconnection or bad connection which may otherwise be caused by violent vibration or toppling. Furthermore, even when rainwater enters the device, any short circuit does not take place since the contacts are positioned on both sides of the inserts 9 in spaced relation.

However, it is preferable that a suitable gap(s) C is formed between the junction of the casing 1 and the bracket 6 since, when rainwater enters the device, there may be a short in the electric system due to capillarity occurring between both contacts.

While it is left in a given parking area, the bicycle is locked with removal of the casing 1 by pushing up the locking plate 4 of the casing 1 to disengage it from the locking projection 10 of the bracket 6 and, then, moving slidingly the casing 1 in the direction counter to the mounting direction. Thus removed casing 1 may be carried around or stored for the burglarproof purpose, and the electric appliances are not exposed to rain, snow or solar heat.

For multi-purpose use, the casing 1 may be replaced with another casing having different electric appliances.

Preferably, a suitable number of grooves 15 may be formed in the sliding surfaces of the inserts 9 of the bracket 6 to reduce the contact area thereof as much as possible. This helps prevent the sliding surfaces of the resilient contacts 3 from wearing off due to repeated attachment and detachment of the casing 1.

What is claimed is:

1. A device for detachably attaching an electric appliance to a frame, including a handle bar pipe, said electrical appliance comprising a casing adapted to have therein suitable electric components, said casing being provided at one side with a pair of first opposed grooves which receive a pair of resilient contacts, one wall of each first groove being defined by a guide member, and a locking resilient plate between the first opposed grooves having therein a locking opening, said device comprising a bracket adapted to be clamped on the handle bar pipe of said frame, said bracket having guide grooves for receiving the guide members on said casing and a pair of inserts secured to said bracket and arranged to be slidingly inserted into said first opposed grooves in the said casing, said inserts each having a contact to be connected to wiring and a sliding surface adapted to be engaged with one of said resilient contacts, said resilient contacts and said inserts resiliently engaging one another within said first opposed grooves, said bracket having a projection to be engageable within said locking opening in said locking resilient plate for detachably locking the casing to the bracket, whereby the wiring circuit is closed or broken simultaneously with attachment or detachment of said casing.

2. The device as claimed in claim 1, in which a plurality of grooves are formed in the sliding surfaces of said inserts, to reduce the contact area between the inserts and the resilient contacts and extend the life of the resilient contacts.

* * * * *